(12) United States Patent
Tamura

(10) Patent No.: US 7,386,183 B2
(45) Date of Patent: Jun. 10, 2008

(54) METHOD AND APPARATUS FOR IMAGE PROCESSING

(75) Inventor: Tadashi Tamura, North Haven, CT (US)

(73) Assignee: Aloka Co., Ltd., Tokyo (JP)

( * ) Notice: Subject to any disclaimer, the term of this patent is extended or adjusted under 35 U.S.C. 154(b) by 580 days.

(21) Appl. No.: 10/903,158

(22) Filed: Jul. 30, 2004

(65) Prior Publication Data
US 2006/0013501 A1 Jan. 19, 2006

Related U.S. Application Data

(60) Provisional application No. 60/586,550, filed on Jul. 9, 2004.

(51) Int. Cl.
*G06K 9/40* (2006.01)
(52) U.S. Cl. .................................... 382/260; 382/254
(58) Field of Classification Search ................ 382/128, 382/260–269, 132, 300; 375/240.12
See application file for complete search history.

(56) References Cited

U.S. PATENT DOCUMENTS

| 4,720,871 | A | | 1/1988 | Chambers | |
| 4,947,446 | A | | 8/1990 | Jutand | |
| 5,575,286 | A | * | 11/1996 | Weng et al. | 600/444 |
| 6,122,314 | A | * | 9/2000 | Bruls et al. | 375/240.12 |
| 6,389,441 | B1 | | 5/2002 | Archer | |
| 6,778,692 | B1 | * | 8/2004 | Yazici | 382/132 |
| 2004/0091174 | A1 | * | 5/2004 | Wang et al. | 382/300 |

* cited by examiner

*Primary Examiner*—Jingge Wu
*Assistant Examiner*—Jayesh A Patel
(74) *Attorney, Agent, or Firm*—Bachman & LaPointe, P.C.

(57) ABSTRACT

A method for image processing comprising the steps of processing an image comprising a plurality of pixels each having an intensity to produce an image processed image comprising a plurality of pixels, applying a preservation filter to the image to produce at least one preservation value corresponding to at least one of the plurality of pixels of the image, computing a weight coefficient $\alpha$, for each of the at least one preservation values, and using each of the at least one weight coefficients to mix the image with the image processed image to produce an output image comprising a plurality of pixels.

8 Claims, 3 Drawing Sheets

| −1 | 2 | −1 |
|----|---|----|
| −1 | 2 | −1 |
| −1 | 2 | −1 |

⎯21

| −1 | −1 | −1 |
|----|----|----|
| 2  | 2  | 2  |
| −1 | −1 | −1 |

⎯21

| −1 | −1 | −1 |
|----|----|----|
| −1 | 8  | −1 |
| −1 | −1 | −1 |

⎯31

| 0  | −1 | 0  |
|----|----|----|
| −1 | 4  | −1 |
| 0  | −1 | 0  |

⎯31

METHOD AND APPARATUS FOR IMAGE PROCESSING

CROSS REFERENCE TO RELATED APPLICATION

This application claims the benefit of U.S. Provisional Application Ser. No. 60/586,550, filed Jul. 9, 2004.

BACKGROUND OF THE INVENTION

1. Field of Invention

The present invention relates to a method and apparatus of image processing to enhance image qualities and to reduce noise in ultrasound imaging.

2. Description of Related Arts

Image processing typically enhances image quality by smoothing, sharpening and improving the overall image contrast. Smoothing, for example, can reduce noise and improve contrast. However, in the case of medical imaging, smoothing may cause the loss of some clinically important features. Such important image features are usually detected as discontinuities by discontinuity detection filters. Detection of discontinuities can be performed at a level of edge, line, or point. With reference to FIG. 1, there are illustrated prior art edge detection filters 11. With reference to FIG. 2, there are illustrated prior art line detection filters 21. With reference to FIG. 3, there are illustrated prior art point detection filters 31. Unfortunately, prior art filters 11, 21, and 31 all tend to be sensitive to noise or the signal to noise ratio of the image. There is therefore needed a filter for both detecting and preserving important image features.

SUMMARY OF THE INVENTION

Accordingly, it is an object of the present invention to provide a method and apparatus of image processing to enhance image qualities and to reduce noise in ultrasound imaging.

In accordance with the present invention, a method for image processing comprises the steps of processing an image comprising a plurality of pixels each having an intensity to produce an image processed image comprising a plurality of pixels, applying a preservation filter to the image to produce at least one preservation value corresponding to at least one of the plurality of pixels of the image, computing a weight coefficient $\alpha$, for each of the at least one preservation values, and using each of the at least one weight coefficients to mix the image with the image processed image to produce an output image comprising a plurality of pixels.

In accordance with the present invention, an apparatus for image processing comprises an apparatus for processing an image comprising a plurality of pixels each having an intensity to produce an image processed image comprising a plurality of pixels, an apparatus for applying a preservation filter to the image to produce at least one preservation value corresponding to at least one of the plurality of pixels of the image, an apparatus for computing a weight coefficient $\alpha$, for each of the at least one preservation values, and an apparatus for using each of the at least one weight coefficients to mix the image with the image processed image to produce an output image comprising a plurality of pixels.

DETAILED DESCRIPTION OF THE PREFERRED EMBODIMENTS

It is therefore a teaching of the present invention to provide a method for performing any form of image processing on an image, particularly smoothing and edge enhancement, which reduces spurious noise and unwanted artifacts while preserving, however small, features which are indicative of real underlying structure. This is achieved by applying a preservation filter to an image so as to determine the statistical likelihood that any given pixel differs from the pixels in its vicinity for reasons related to structural differences and the composition of the area corresponding to the pixel and not as a result of noise or error in the image. Once the preservation filter is applied so as to compute a preservation value corresponding to the probability that a given pixel is a result of actual structure, the preservation value is used to modulate the amount of image processing that is performed on the pixel which might smooth or otherwise tend to diminish the influence of the pixel. In short, in instances wherein the preservation value indicates that a given pixel represents actual structure, the effects of image processing on the image which might tend to smooth such a pixel, are diminished. Conversely, in instances wherein the preservation value indicates that the pixel under examination is not likely to represent actual structure, but rather indicates spurious noise or other error injected into the image, image processing which serves to smooth or otherwise alter the value of such a pixel, is allowed to take effect to a greater extent.

As noted, image processing takes many forms including, but not limited to, the enhancement of edges, contrast, and reduction of noises such as speckles.

Figure 5:
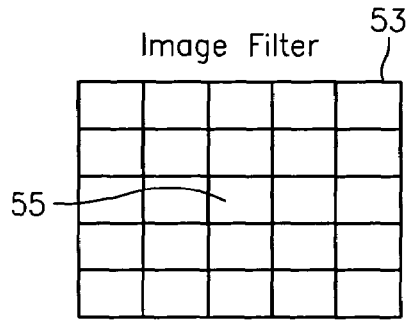
FIG. 5. Image filter of the present invention.
Figure 5A:
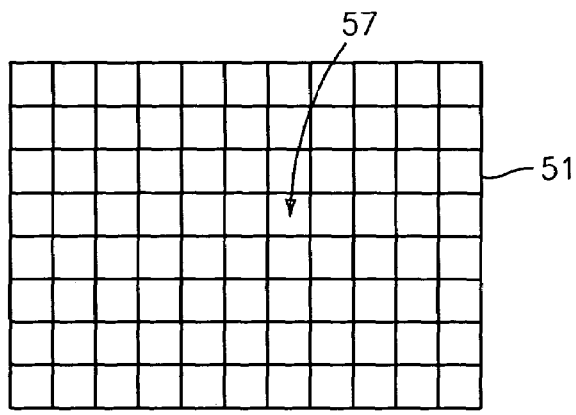

With reference to FIG. 5, there is illustrated an image filter 53 and an image 51 as known in the art. Image filters 53 are typically constructed to be of an odd number of rows by an odd number of columns so that there exists a center pixel 55 in the middle of image filter 53. At the intersection of each row and column of image filter 53, there is provided a filter coefficient (not shown). Image 51 is likewise comprised of a plurality of pixels arranged in rows and columns. When image filter 53 is placed over a portion of image 51, each underlying pixel value of image 51 corresponding to each pixel of image filter 53 are typically multiplied by the image filter coefficients. Once multiplied, the results may be added, subtracted, multiplied or statistically manipulated to yield an image process pixel value. This image processed pixel value is typically assigned to the pixel of image 51 corresponding to center pixel 55 of image filter 53. Image filter 53 is typically applied to an image 51 by placing the image filter 53 including center pixel 55 over the pixels comprising image 51. By so doing, a processed image (not shown) corresponding to image 51 is created whereby the pixel value of each pixel in the processed image is the result of the computation performed by image filter 53 upon the pixels of image 51.

In a preferred embodiment of this invention, image processing can be any type, adaptive or non-adaptive and may include for example, a two-dimensional image filter 53 as shown in FIG. 5 or multi-dimensional filters of low-pass filter, high-pass filter or band-pass filter or median filter, or speckle reduction filter or any other types of filtering. The 5×5 image filter 53 in FIG. 5 is for illustration purpose and can be a spatial domain filter of other sizes or a frequency domain filter.

Figure 6:
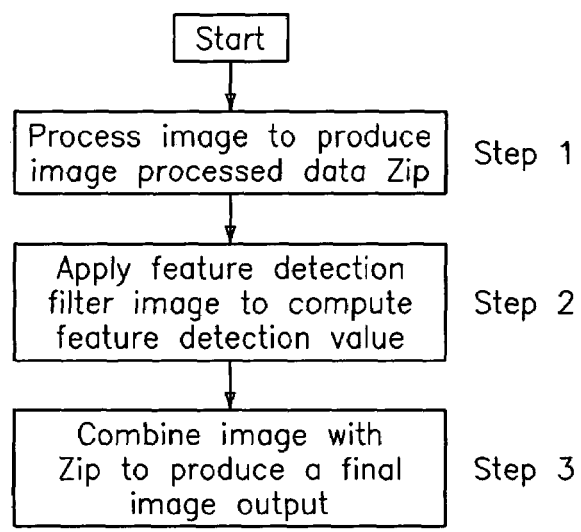
FIG. 6. A flow chart of the method of the present invention.

As noted, image processing is a powerful tool to bring a true image out of a noisy image. However, image processing may sometimes result in the loss of real information. Therefore, the present invention teaches a method for detecting and preserving strong features in an original image. With reference to FIG. 6, there is illustrated the method of the present invention. As will be described more fully below, an image is image processed to produce an image processed image, $z_{ip}$. A feature detection filter 41 is applied to the original image 51 in a small area corresponding to the size of the feature detection filter 41 and is moved and applied to another small area so that for at least one pixel of the image a preservation value is computed. Therefore, the preservation value likely varies from one area to another on a pixel-by-pixel basis. Lastly, the preservation value is utilized to modulate the amount of the processed image that is mixed with the original image to produce an output image on a pixel-by-pixel basis.

With continued reference to FIG. 6, at step 1, an original image is image processed to produce an image processed image, $z_{ip}$. Such image processing may be of any type known in the art and/or described above.

Figure 1:
FIG. 1. Edge detection filters (Prior art).
Figure 1:
Figure 1:
Figure 1:
Figure 1:
Figure 1:
Figures 2, 3, 4:
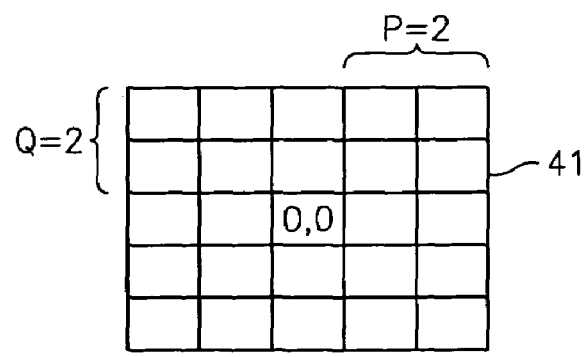
FIG. 2. Line detection filters (Prior art).
FIG. 3. Point detection filters (Prior art).
FIG. 4. Image feature preservation filter.

With reference to step 2, a feature detection filter is applied to the original image so that for at least one pixel of the image, a preservation value is computed. A feature detection filter 41 measuring (2P+1) by (2Q+1) pixels is illustrated with reference to FIG. 4. In one embodiment, feature detection filter 41 involves computing a preservation value as the sum of the absolute differences (SAD) in pixel values in the neighborhood of a target pixel 57 as applied to the image 51 ($z_{ij}$) to be processed as defined by the following equation (1):

$$SAD = \sum_{\substack{i=-P \\ j=-Q}}^{\substack{i=P \\ j=Q}} |z_{i,j} - z_{0,0}| \tag{1}$$

where the target pixel 57 corresponds to the coordinate (0,0) of the feature detection filter 41. The absolute difference from the center or target pixel at (0,0) is calculated for each pixel or position at (i, j) in the feature detection filter illustrated in FIG. 4. While a 5×5 SAD filter (P=2, Q=2) is illustrated for exemplary purposes, the size of the feature detection filter can be smaller (e.g. 3×3) or larger (e.g. 7×7, 9×9, etc.). The absolute differences at each pixel are summed as expressed in equation (1). SAD can be further normalized by the number of pixels in the feature detection filter minus one (corresponding to the target pixel 57) as expressed in equation (2).

$$NSAD = \frac{1}{(2P+1)(2Q+1)-1} \sum_{\substack{i=-P \\ j=-Q}}^{\substack{i=P \\ j=Q}} |z_{i,j} - z_{0,0}| \tag{2}$$

The sum of square differences (SSD) can be also used which is defined as follows, $$SSD = \sum_{\substack{i=-P \\ j=-Q}}^{\substack{i=P \\ j=Q}} (z_{i,j} - z_{0,0})^2 \tag{3}$$

And SSD can be further normalized as follows, $$NSSD = \frac{1}{(2P+1)(2Q+1)-1} \sum_{\substack{i=-P \\ j=-Q}}^{\substack{i=P \\ j=Q}} (z_{i,j} - z_{0,0})^2 \tag{4}$$

The sum of the absolute differences are used for fast speed but other forms of statistics (e.g. variance) can be used to detect strong image features such as bright spots or points. The feature detection filter also uses the image pixel value. If the sum of the absolute differences is very high and the pixel value is very high, or bright, a very strong feature is considered found and preserved rather than applying a smoothing filter, or a speckle noise reduction filter or others.

Depending on the SAD, NSAD, SSD or NSSD value and the target pixel intensity, the original image $z_{orig}$ and filtered (image processed) image, $z_{ip}$, are mixed together on a pixel-by-pixel basis as expressed in equation 5 and illustrated as step 3 in FIG. 6. For example, if the SAD and the target pixel intensity are high, more of the original image is used and less of the processed image is used when mixing the processed image with the original image to compute an output image. The extent to which each image is included when combining the image with the processed image to form the final image output is controlled by a weight coefficient α as defined by the following equation:

$$z_{out} = \alpha \cdot z_{ip} + (1-\alpha) \cdot z_{orig} \tag{5}$$

where $z_{out}$: final image pixel output;
α: a weight coefficient corresponding to the target pixel;
$z_{ip}$: image processed pixel data;
$z_{orig}$: original image pixel data of image 51.
α is dependent on the original image amplitude (or intensity) I and SAD value as follows, In a preferred embodiment, if I>80 (for 8 bits (or maximum value of 255) grayscale image), $$\alpha = 1 - \frac{SAD - 720}{960},$$

if 1680>SAD>720 and I>80 (6)
α=0, if SAD>=1680 and I>80
α=1.0, if SAD<=720 and I>80
if I<80, α=1.0, for any SAD for the 5×5 filter size for an 8-bit grayscale image with the maximum intensity of 255 (or range of 0 to 255). In a preferred embodiment, α is quickly obtained using a Look-Up-Table (LUT) of SAD and I rather than actually calculating equation (6) that may take more time. The above equation and expression are only to illustrate the relation among SAD, I and α.

While described with reference to intensity values of a grayscale image and corresponding SAD/NSAD/SSD/NSSD values, also referred to as preservation statistical metrics, the ranges for both I and SAD/NSAD/SSD/NSSD values are presented as an absolute range of intensity and SAD/NSAD/SSD/NSSD values. For example, a value of "I>80" is an intensity greater than eighty of the maximum possible intensity of 255 for an 8-bit grayscale image. Likewise, for an image having a range of intensities for each pixel ranging from zero to a maximum intensity, the possible SAD/NSAD/SSD/NSSD values range from zero to a maximum value. Therefore, "1680>SAD>720" refers to an SAD value between 720 and 1680 in the absolute scale.

Since an image can have other intensity resolutions than 8 bits, the above relation can be more generally expressed by SAD and I normalized by their maximum values, respectively. These values are called SAD % and I %. α can be expressed by the following equations.

$$\alpha = 1 - \frac{SAD\ \% - 11.8\%}{15.7\%},$$

if 27.5%>SAD %>11.8% and I %>31.4% (7)
α=0, if SAD %>=27.5% and I %>31.4%
α=1.0, if SAD %<=11.8% and I %>31.4%
if I %<31.4%, α=1.0, for any SAD %

While described with reference to intensity values of a grayscale image and corresponding SAD/NSAD/SSD/NSSD values, also referred to as preservation statistical metrics, the ranges for both I and SAD/NSAD/SSD/NSSD values can be presented as a percentage of a normalized range of intensity and SAD/NSAD/SSD/NSSD values, for example between zero and one hundred. For example, a value of "I %>31.4%" is an intensity greater than 31.4 percent of the maximum possible intensity, however defined, of a pixel. Likewise, for an image having a range of intensities for each pixel ranging from zero to a maximum intensity, the possible SAD/NSAD/SSD/NSSD values range from zero to a maximum value. Therefore, "27.5%>SAD %>11.8%" refers to an SAD % value between 11.8% and 27.5% of the maximum SAD/NSAD/SSD/NSSD value.

While the embodiment described above makes use of exemplary boundary values for both SAD/NSAD/SSD/NSSD values, and intensity values, such boundary values are exemplary and may be altered depending upon the circumstances of image creation. Such boundary values are preferably chosen so as to be sufficient to preserve small structures of interest in an image while allowing for the substantial elimination of noise or other data corruption.

Regardless of the boundary values chosen, α is assigned a value according to the following methodology. If the intensity is less than a boundary value (e.g. 80), α is equal to a maximum α value (preferably ~1.0) regardless of the SAD/NSAD/SSD/NSSD or preservation statistical metric value. If the intensity is above the boundary value, then α equals the maximum α value if the SAD/NSAD/SSD/NSSD value is in a low region (e.g. SAD<=720 or SAD %<=11.8%), α equals a minimum α value (preferably ~0.0) if the SAD/NSAD/SSD/NSSD value is in an upper region (e.g. SAD>=1680 or SAD %>=27.5%), and α is linearly related to the SAD/NSAD/SSD/NSSD value in a middle region (e.g. 1680>SAD>720 or 27.5%>SAD %>11.8%).

As a result, in the example above, α is linearly proportional to SAD/NSAD/SSD/NSSD in the middle region (or SAD between 720 and 1680 or SAD % between 11.8% and 27.5%) if the image intensity I is over an intensity threshold of 80 (or if I % is over 31.4%). As noted, such values are expressed herein in exemplary fashion and are dependent on the type of images and vary from one application (e.g. liver) to another (e.g. fetus). In this case, an image intensity of 80 was used as a threshold but this is for simplicity to illustrate the method. In another embodiment, the threshold of 80 can be made to vary depending on SAD. In another embodiment, α can decrease faster with SAD than the above linear function. α can be another function of SAD and I. Regardless of the relation among I, SAD and α, α is determined by a two-dimensional table of SAD and I or a look-up table (LUT). The above equation of α is only for illustration purpose and can take any form using these two parameters (SAD/NSAD/SSD/NSSD and I). In another embodiment, in addition to SAD/NSAD/SSD/NSSD and I, other statistics such as mean and variance (standard deviation) or others can be used.

Figure 7:
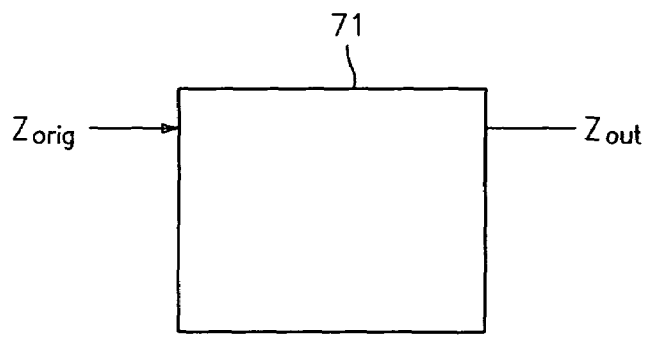
FIG. 7. A diagram of the apparatus of the present invention.

With reference to FIG. 7, there is illustrated a preferred embodiment of an apparatus utilized to perform the method of the present invention. A processor 71 receives the original image $z_{orig}$ and outputs an output image $z_{out}$. The processor 71 is preferably a digital signal processor. In all instances, processor 71 is an electronic device capable of receiving digital information formatted so as to represent an input image $z_{orig}$. Processor 71 acts upon the input image $z_{orig}$ to apply the preservation filter, to process the original input image to create an image processed image $z_{ip}$, to compute a weight coefficient α for each of at least one computed preservation values, and to mix the original image with the image processed image to produce an output image $z_{out}$.

In another embodiment, SSD can be used in combination with other statistical values such as mean of pixels in the image corresponding to the preservation filter, variance, standard deviation or any other statistical metric. α is also determined on a pixel-by-pixel basis and thus varies from a point to another in an image.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for image processing comprising the steps of:
processing an image comprising a plurality of pixels each having an intensity to produce an image processed image comprising a plurality of pixels;
applying a preservation filter to said image to produce at least one preservation value corresponding to at least one of said plurality of pixels of said image;
computing a weight coefficient α, for each of said at least one preservation values; and
using each of said at least one weight coefficients to mix said image with said image processed image to produce an output image comprising a plurality of pixels,
wherein said computing said weight coefficient α comprises the steps of:
setting α to a maximum value if an intensity of a target pixel is less than or equal to a boundary value;

setting α to a maximum value if an intensity of said target pixel is greater than said boundary value and said preservation value corresponding to said target pixel is in a low region;

setting α to a minimum value if an intensity of said target pixel is greater than said boundary value and said preservation value corresponding to said target pixel is in an upper region; and setting α proportional to a preservation statistical metric if an intensity of said target pixel is greater than said boundary value and said preservation value corresponding to said target pixel is in a middle region.

2. The method of claim 1 wherein processing said image comprises performing imaging processing selected from the group consisting of smoothing, edge enhancement, low-pass filtering, high-pass filtering, band-pass filtering, median filtering, speckle reduction filter, noise reduction, and contrast improvement.

3. The method of claim 1 wherein said applying said preservation filter comprises:

applying said preservation filter to said image to compute at least one preservation statistical metric each corresponding to a single pixel of said image.

4. The method of claim 3 wherein said applying said preservation filter comprises computing said at least one preservation statistical metric selected from the group consisting of sum of absolute differences (SAD), normalized sum of absolute differences (NSAD), sum of square differences (SSD), normalized sum of square differences (NSSD), mean, variance, and standard deviation.

5. The method of claim 1 wherein said computing said weight coefficient comprises computing said weight coefficient from said intensities of said plurality of pixels of said image corresponding to said preservation filter and said at least one preservation value.

6. The method of claim 5 wherein said computing said weight coefficient comprises utilizing a lookup table (LUT).

7. The method of claim 1 wherein producing said output image comprises calculating each of said plurality of pixels of said output image according to the equation $Z_{out} = \alpha \cdot Z_{ip} + (1-\alpha) \cdot Z_{orig}$ where $Z_{out}$ is a pixel of said output image, $Z_{ip}$ is a said image pixel in processed image, and $Z_{orig}$ is a corresponding pixel in said image.

8. An apparatus for image processing comprising:

means for processing an image comprising a plurality of pixels each having an intensity to produce an image processed image comprising a plurality of pixels;

means for applying a preservation filter to said image to produce at least one preservation value corresponding to at least one of said plurality of pixels of said image;

means for computing a weight coefficient α, for each of said at least one preservation values; and means for using each of said at least one weight coefficients to mix said image with said image processed image to produce an output image comprising a plurality of pixels, wherein said means for applying said preservation filter further comprises the following:

means for setting α to a maximum value if an intensity of a target pixel is less than or equal to a boundary value;

means for setting α to a maximum value if an intensity of said target pixel is greater than said boundary value and said preservation value corresponding to said target pixel is in a low region;

means for setting α to a minimum value if an intensity of said target pixel is greater than said boundary value and said preservation value corresponding to said target pixel is in an upper region; and means for setting α proportional to a preservation statistical metric if an intensity of said target pixel is greater than said boundary value and said preservation value corresponding to said target pixel is in a middle region.

* * * * *